May 31, 1966    A. M. MARKS ETAL    3,253,506
STABLE, STRETCH-ORIENTED, LIGHT POLARIZING POLYMERIC FILM
Filed July 29, 1963                    2 Sheets-Sheet 1

INVENTORS
ALVIN M. MARKS
MORTIMER M. MARKS
BY Albert F. Kronman
ATTORNEY

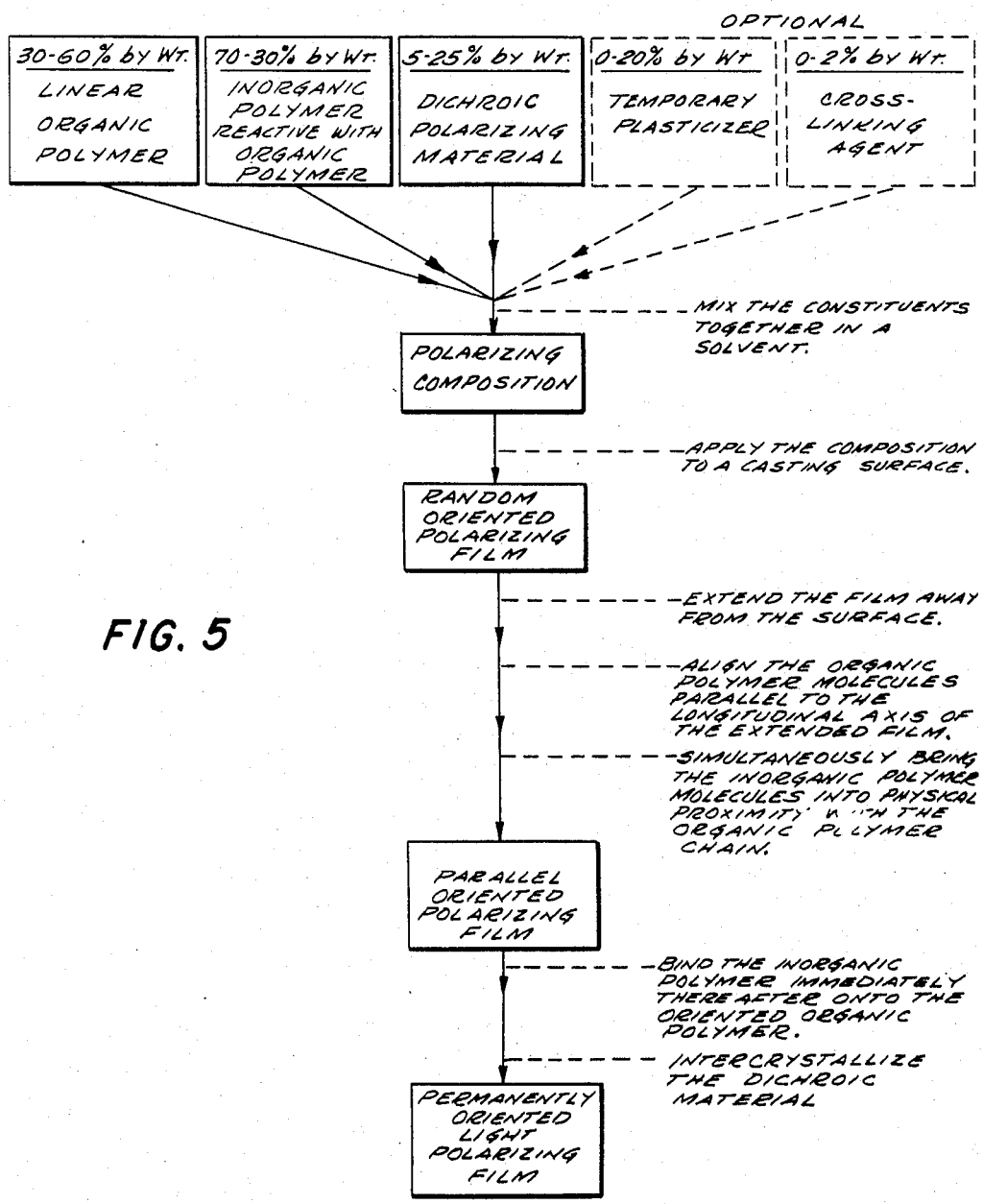

3,253,506
STABLE, STRETCH-ORIENTED, LIGHT POLARIZING POLYMERIC FILM
Alvin M. Marks, 153—16 10th Ave., and Mortimer M. Marks, 166—25 Cryders Lane, both of Whitestone, N.Y.
Filed July 29, 1963, Ser. No. 298,023
7 Claims. (Cl. 88—65)

This invention relates to a method of manufacture of films and fibres, and more particularly to a method of forming articles capable of polarizing light passing therethrough.

This application is a continuation-in-part of an application entitled "Light Polarizing Film and Fibre Forming Composition and Method," Serial No. 799,764, filed March 16, 1959, in the name of Alvin M. Marks and Mortimer Marks, now abandoned.

The manufacture of polymeric films and polarizing and birefringent articles in the form of films and fibres is well known in the art. However, presently known polarizing films and fibres which are made by stretching and dyeing high polymer plastics are subject to several shortcomings. Some of these shortcomings result from the materials employed and others from the manner in which these articles are made. These polarizing films or fibres generally lack sufficient hardness, stability, in the presence of elevated temperatures and solvents, and satisfactory weathering characteristics.

In the prior art two kinds of stretch have been taught for orienting and crystallizing polymeric materials containing long chain molecules. These two types of stretching have been described in terms of the state of the polymer employed at the time of the stretching operation as "solid state stretching" and "rubber elastic stretching."

In the "solid state" stretching, the linear high polymers are in a condition in which they contain little or no solvent or plasticizers, and are not at too elevated a temperature. The techniques by which this form of the polymer is extended is often referred to as "cold drawing." The term "cold drawing" does not relate to the temperature of the polymeric material but refers to an extending of the material in a condition which is below the softening or melting point of the polymer. While the materials are said to be in the "solid state" when cold drawn, the molecules of the polymer must have sufficient slip to be extended without fracture. In this respect the "solid state" of the linear high polymer must be distinguished from "solid-brittle" state which is not capable of being drawn.

In the case of the "cold-drawn" stretch technique, there is a tendency for the oriented or crystallized strip to retract or collapse almost to its original length upon heating, or upon immersion in a swelling solvent. The retraction occurs because at higher temperatures the random vibrations induced in the molecular structure are sufficient to break apart the weak bonds holding the crystalline structure together, and the same is true by the introduction of strong solvents which enter in between the aligned weakly bound crystalline lattice and break it apart by swelling action. The solvent molecules enter between the stretched long chain molecules, which may be compared to a plurality of elongated weak coil springs, and the release of the forces tending to hold them in extension, permits them to retract toward their original shape.

Linear high polymers stretched in the "rubber elastic" state have been described as having the properties of vulcanized rubber. They are placed in this state by the addition thereto of a considerable proportion of solvent or plasticizer. When raised to an elevated temperature, some of the linear high polymers will also present the extreme elasticity which has been characterized by the term "rubber elastic." Linear high polymers which are in the "rubber elastic" state have been further compared to vulcanized rubber in that when the force stretching said polymers is released, the material will immediately return to almost its original length.

It has been observed that linear high polymers which are in a condition characterized by the term "rubber elastic" when subjected to stretch, yield rather uniformly as does a rubber band and continue to stretch throughout the application of the force until they reach the limit of stretchability. The orientation improves slowly at first with stretch everywhere along the strip being stretched, and does not reach substantial or high orientation until stretched very near the limit of elasticity.

The method or process by which the molecules were stretched or the condition of the material when stretched does not affect or bring about the "memory" behaviour or tendency to retract, of the originally coiled, randomly oriented molecules. However, in order to achieve stability, it is necessary to produce a condition of irreversible stretch as hereinafter set forth.

Accordingly, it is an object of the present invention to provide stable, oriented non-retractable polymeric films, sheets and fibres, which articles will overcome the deficiencies of presently known products.

Another object of the present invention is to provide birefringent and light polarizing films of high optical clarity which lend themselves to deposition upon a glass or plastic support and which form a hard, durable and stable surface thereon.

A further object of the present invention is to provide a polarizing film which will not retract, or deteriorate in the presence of sunlight, heat or solvents.

Still a further object of the invention is to provide a method of preparing stable, oriented, non-retractable birefringent and light polarizing films.

Yet another object of the instant invention is to provide a crystallizing composition for making such films.

The foregoing objects of the invention are achieved herein by a process for preparing stable, oriented, non-retractable polymeric films, and also light polarizing and birefringent films. In accordance with this process, there is provided a composition including 30–60% by weight of a stretchable, linear, organic polymer, 70–30% by weight of an inorganic polymer which is capable of binding chemically with the organic polymer and, when light polarizing films are desired, 5–25% by weight of a dichroic material, in a suitable solvent. The composition so provided is then applied to a casting surface and dried to form a film of random oriented molecules. Next a portion of the film is grasped and extended away from the casting surface, thereby aligning the organic polymer molecules of the extended portion in a direction substantially parallel to the longitudinal axis of the extended film. Simultaneously, the inorganic polymer constitutent of the film is brought in proximate and parallel physical relationship with the organic polymer chain. As a result of this proximity, the inorganic polymer immediately becomes bound or grafted to its parallel positioned organic polymer chain neighbor by a chemical proximity reaction between functional groups present in each of the polymer molecules. Finally, the dichroic material of the composition, if present, intercrystallizes with the film to produce a stable, oriented, non-retractable light polarizing film.

In the accompanying drawing forming part of the present specification:

FIGURE 5 is a flow sheet which summarizes the sequence of process steps of the present invention.

Figure 1:
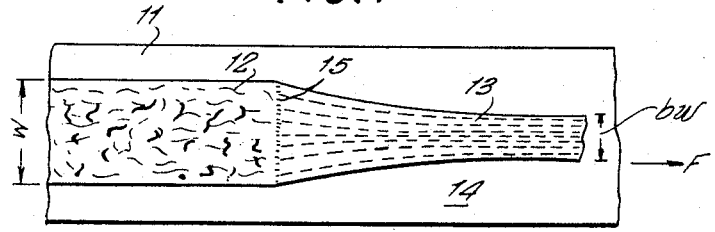
FIGURE 1 is a top plan view of a strip of polymer material prepared in accordance with the present invention showing the manner in which it is abruptly changed from the solid amorphous state into a crystalline oriented state by an irreversible cold drawing technique.
Figure 2:
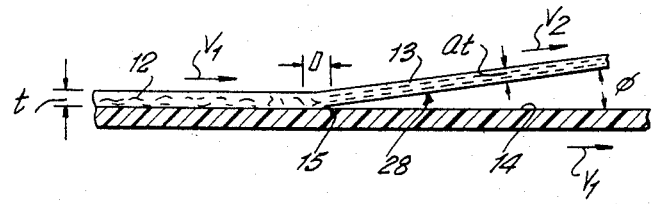
FIGURE 2 is a view in side elevation of the stretching operation shown in FIGURE 1 with the respective film thicknesses magnified for the sake of clarity.

Referring to the drawings, and particularly to FIGURES 1 and 2, there is shown the generalized procedure for forming permanently oriented polymeric film in accordance with the present invention. A support 11, such as Mylar, Teflon, glass, metal or some other suitable material holds a film 12 which has been cast from solution and substantially dried to eliminate most of the volatile solvents. A uniform tension indicated by the arrow F, is applied to a portion of the film such as the strip or fibre 13 which has been lifted from the casting surface 14, resulting in a strip or fibre velocity $V_2$. The casting surface 14 may also move forward at a smaller velocity $V_1$, during the process shown in FIGURES 1 and 2. In this invention the velocity $V_1$ is so regulated that the line along which the film strip 13 leaves the support 14, hereinafter referred to as the line of takeoff, is maintained in a stationary position as the oriented material 13 is drawn off at a velocity $V_2$ at the line of takeoff 15, at which place the film suddenly diminishes in thickness, and the film is abruptly oriented within a microscopic distance of transition indicated at D. Over this small distance, D, the thickness diminishes from "$t$" to "$at$" with the relationship $0.3 < a < 0.6$. The width of the film $w$, diminishes more slowly from "$w$" to "$bw$," and may be expressed as $0.5 < b < 0.7$. A preferred thickness $t$ is of the order of 3–10 microns, and the distance D equals $kt$, where $k$ is of the order of 1 to 10.

Figure 3:
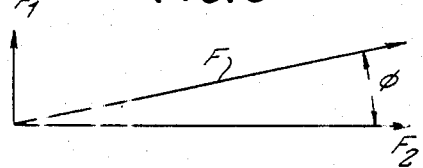
FIGURE 3 is a force diagram illustrating the process of FIGURE 2.

As shown in the force diagram of FIGURE 3, the component of force $F_1$ is normal to the surface 1. The angle $\theta$ in FIGURES 2 and 3, is the angle between the extended portion of the film 13 and the casting surface 14 starting with the line of takeoff 15. To keep the component of force $F_1$ small, the angle $\theta$ must also be small, of the order of 0.1° to 10°. The adhesion of the cast film 12, to the supporting surface 14 must be somewhat greater than the force $F_1$. The component of force $F_1$ must be small to keep the film 2 from lifting off the surface too rapidly at the line of takeoff 15. It has been discovered that the angle of $\theta$ is quite important as a control factor for the stretch ratio since greater stretch ratios may be achieved at smaller angles $\theta$, and vice versa. Thus, the force F is used primarily for extending the film 13 which is in the solid state without lifting the balance of the unoriented portion of the film 12 from the surface 14. The ratio $R = V_2/V_1$ may be of the order of 2 to 10 depending upon the materials used, the angle $\theta$, and the velocity of the extension process.

Figure 4:
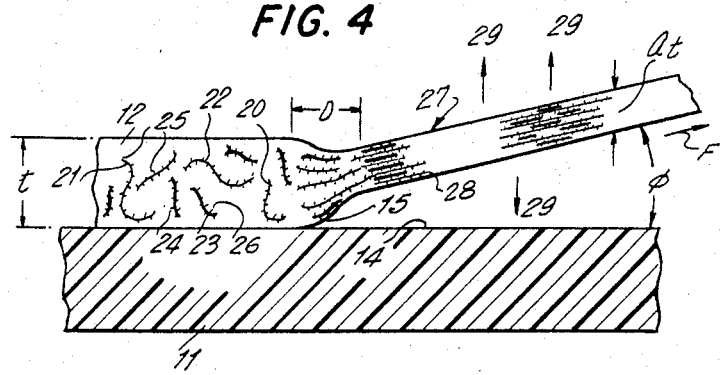
FIGURE 4 is a fragmentary view of portion of FIGURE 2 greatly enlarged showing somewhat schematically, the manner in which the simultaneous alignment and binding steps of the invention acts to produce a permanently oriented polymeric film or fibre.

Referring now to FIGURES 4 and 5, there is illustrated the improved process of forming stable, oriented, non-retractable films in accordance with the present invention. FIGURE 4 is a pictorial representation of the process steps; FIGURE 5 is a schematic diagram in which the steps are summarized in flow form.

As shown in these figures, the first step in the improved process herein is the formation of a polymeric composition. For the sake of clarity, compositions suitable for casting polymeric films or birefringent films without dichroic material, will be called crystallizing compositions. Compositions for casting light polarizing films or fibers will be called polarizing compositions. It will be understood, however, that both compositions are stretch-crystallized according to the present invention.

Both the polarizing and crystallizing compositions are prepared from the following constituents in the proportions indicated:

CRYSTALLIZING OR POLARIZING COMPOSITION

|   |   | Parts by wt. |
|---|---|---|
| (1) | Linear organic polymer | 30–60 |
| (2) | Inorganic polymer | 70–30 |
| (3) | Dichroic material | 0–25 |
| (4) | Plasticizer | 0–20 |
| (5) | Cross-linking agent | 0–2 |
| (6) | Solvent (total) | 100 |

The linear organic polymer constituent of the crystallizing or polarizing composition is a long chain polymer, such as is known in the art, which in the solid state will resist drawing forces for a period of time, during which the force is increasing, and then stretch or yield quite suddenly giving an abrupt and highly uniform alignment of the molecules along the line of stretch almost instantaneously. The organic polymer possesses functional groups which will bind chemically with the inorganic polymer constituent, as will be described in detail hereinafter. A preferred functional group is hydroxyl, although haloamido, epoxy, carboxyl, carboalkoxyl, alkoxyl, acyl, ester, amino, halo, cyano, sulfanamido, cyanoalkyl, halosulfonamido and the like may be considered useful for this purpose as well.

Another desirable characteristic of the organic polymer constituent is solvent compatibility with the inorganic polymer, as will be apparent to those skilled in the art.

Suitable organic polymer materials include elongated, hydroxyl-containing, high molecular weight vinyl polymers, such as polyvinyl alcohol, polyvinyl chloride, and their copolymers, as for example, with acetate, acetal, ketal, pyrrolidine, acrylonitrile and the like, including polyvinyl formal, acetal, propional butyral and isobutyral. Polyesters, polyamindes and other stretchable film-forming polymers may be used as well. Polyvinyl alcohol is a particularly useful material because it is stretchable in the solid state and possesses functional hydroxyl side chains which are capable of condensing well with the residual groups of the inorganic polymer. It also has a particular affinity for dichroic substances.

Suitable inorganic polymers contain residual groups such as those mentioned above for the organic polymer which will graft itself to the oriented organic polymer. Suitable are the polysilicates or polysiloxanes and equivalent structures formed from titanium, vanadium, zirconium, tin, phosphorous and the like, including the polytitanates, stannates, germanates, vanadates, zirconates, phosphates and polyphosphoric polymers and mixtures thereof. Five to ten percent polytitanate intermixed with a polysiloxane greatly decreases water penetration in the finished product. In most cases it is preferred to utilize alkyl substituted polymers, derived from tetrabutyltitanate, isopropyltitanate and titanium lactate, which may be prepared by methods known to the art. Many of these polymers contain carbon-containing substituent groups and are therefore not "inorganic" in the strictest sense of the term. They possess the common characteristic, howeven, that the "backbone" or skeletal structure of the polymer is inorganic as opposed to polymers in which carbon atoms form a constituent of the backbone. For the sake of brevity, they are referred to herein as "inorganic" polymers.

The polysiloxanes have the general formula

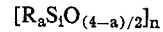

where R is alkyl, alkenyl, aryl, alkaryl, aralkyl, including methyl, vinyl, phenyl, tolyl, benzyl, cumyl, napthyl, biphenylyl and terphenyl and $a$ is greater than zero but less than four. Polysiloxane polymers generally have residual silanol or alkoxy groups which can form condensation polymers by reaction with the functional group of the organic polymer.

The presence of the inorganic polymer constituent of the composition, provides a stable, highly oriented polymeric crystal which is compact and impervious to considerable temperature or solvent action.

Polymeric films and light polarizing products of exceptional stability in the presence of heat and solvents, and with completely irreversible, and non-retractable, stretch may be produced containing a high proportion of polymerized inorganic materials present in varying proportions from 30 to 70% of the total weight of the polarizing composition.

The nature of the dichroic material is not critical. Any such material known in the art may be used. A particularly effective dichroic substance is iodine, which will intercrystallize well with the polymeric materials. Others include the class of chemical compounds associated with direct cotton dyeing.

The amount of dichroic material employed may vary depending upon the kind of polarizer needed and the nature of the dichroic material employed. However, it has been found that ranges between 5-25 parts by weight of the composition are the most useful. In products such as polymeric films, birefringent fibers, no dichroic material is required.

The presence of either the plasticizer or the monomeric cross-linking agent in the crystallizing or polarizing composition is optional. Satisfactory results can be obtained with certain compositions without these. The presence of a temporary plasticizer, however, facilitates the extension step. The plasticizer generally comprises a liquid monomer which reacts with either the inorganic or the organic polymer. For example, glycerine, which initially acts as a temporary plasticizer, will react with a siloxane polymer and remain in the structure after extension, to provide a suitable polarizing film product according to this invention.

Alternatively, the temporary plasticizer may be of the type which evaporates subsequent to the stretch crystallization step as described in copending application Serial No. 799,764.

Other plasticizers include ethylene glycol, triethylene glycol, tetraethylene, hexaethylene, and nonaethylene glycols, ethanol acetamide, ethanol formamide, formamide and ethanolamine salts.

Where iodine is used as the dichroic material, for example, a monomeric cross-linking agent such as boric acid or borax is very suitable. Other known cross-linking materials, such as titanium lactate, glyoxal and diphenyl disocyanate also may be employed to further insolubilize the structure.

The solvent in this composition will depend upon the particular polymeric constituents. Generally it comprises mixtures of water and alcohols although other polymeric compatible solvents, such as dimethylformamide, may be used as well. It is preferred in the case of water-alcohol mixtures to choose an alcohol, such as n-propanol or isopropanol, which will evaporate at approximately the same rate, so the solvent composition will not be disturbed, and all materials will remain in solution or solid solution.

In connection with the generalized composition set forth hereinabove, it is desirable that the polymer constituents be kept within the ranges indicated. For example, when the amount of linear organic polymer is reduced below 30 parts by weight, the composition loses the physical strength necessary for extension and the composition becomes too brittle. When the amount of linear organic polymer exceeds 60 parts by weight, on the other hand, the composition lacks the advantages of the stabilizing properties of the inorganic polymer. Also when the composition contains less than 30 parts by weight of the inorganic polymer, the finished product may retract or deteriorate under certain conditions of heat or solvent. More than 70 parts by weight of inorganic polymer in the composition may result in a mixture which is too brittle to extend.

Furthermore, when more than 20 parts by weight of a temporary plasticizer is employed, the finished or cast film is not sufficiently hard and is less stable. This structure swells and retracts when exposed to solvents. The alignment produced at the line of takeoff during extension also is not as irreversible as desired.

Each constituent is prepared separately and then mixed together to form the desired composition. Preferably mixing is carried out in a certain order. For example, it is desirable to first combine both polymer constituents and thereafter add the dichroic material with stirring until the solution is uniform and flows readily. There may be a certain tendency for the solution to gel at first, but as vigorous stirring is continued a smooth solution is achieved. The solutions thus prepared are usually stable and may be used for several days before irreversible gelling occurs.

The polarizing solution prepared above is then pressure filtered through a porous ceramic filter and agitated further to render the solution homogenous in viscosity. Bubbles are allowed to rise, and when the solution is free from bubbles, which usually takes about an hour, the solution is ready for casting, upon a suitable non-reacting surface. After casting the composition is dried for a period of 15-30 minutes. At this juncture the film produced will be substantially dry and in the solid state. However, the molecules of the film are completely randomly oriented.

This process is schematically illustrated in FIGURE 4 in which 14 is the casting surface, 12 is the amorphous cast film, 20, 21 and 22 are long chain organic polymer molecules having reactive side groups indicated by lines 25 and intermixed therewith is an inorganic polymeric material schematically illustrated by the thicker lines 23 and 24 with co-reactive groups shown as lines 26. These molecules are present in this region in a randomly coiled configuration in space constituting an illustration of an amorphous condition.

When the casting mixture dries, it becomes jet black, the cast film 13 is continuously extended and stretched away from the casting surface along a sharp, straight line 15 as illustrated in FIGURES 1 and 4.

In the region shown as 15 on the drawing in FIGURE 4 over the distance indicated by D, the material is being necked down and becomes oriented as the molecules are being drawn into parallelism as illustrated. In the region shown at 27 in FIGURE 4, the organic polymer molecules 20, 21 and 22 become fully aligned in a direction substantially parallel to the longitudinal axis of the extended film. Simultaneously the inorganic polymer molecules 23 and 24 within the film are brought into proximate reactive physical relationship with the thus oriented organic polymer molecules, preferably in parallel relationship as shown in FIGURE 4.

The molecules of the co-reactant polymers are drawn parallel so that the functional groups along the parallel chains can react in situ and thus permanently bind the chains together by strong chemical bonds. Thereupon a condensed polymer chain 28 is formed within the film.

This "proximity reaction" actually constitutes a new metastable state of matter in which the reactants are dormat in the amorphous condition, and are caused to react as soon as a degree of alignment orientation or crystallinity is achieved by stretching the molecules of the linear high polymer into parallelism whereby the components to the reaction are brought into closer physical contact. Such a reaction or grafting, has the effect of producing an irreversible stretch. In other words, a material which is extended, and simultaneously subjected to the "proximity reaction" is thereafter resistant to heat or solvent action and, thus, cannot subsequently be caused to retract with its corollary; a possible return to the amorphous condition.

The dichroic material then is intercrystallized with the extended film when it is desired to impart polarizing characteristics to the film. It is believed that the atoms or molecules of dichroic material become arranged between the active groups of the long chain organic polymer chain.

As the film pulls away from the casting surface, it immediately becomes transparent, neutral in shade and appearance, and possesses excellent polarizing properties. The film may be withdrawn from the casting surface and extended continuously. The polarizing film at this point can be deformed slightly for a short time and caused to adhere to curved surfaces, if desired. For example, it is possible to laminate the polarizing film shortly after production directly to a curved lens surface to produce polarized lenses.

Due to the residual solvents still remaining in the film, and to groups as yet unreacted, adhesion to certain surfaces, such as glass or plastic, is readily obtained by chemical bond. However, when the film is allowed to dry naturally, or when expulsion of residual solvent is hastened by heating, for example for 2 hours at 90° C., followed by 5 to 10 minutes at 140° C., an extremely hard insoluble surface lamination results. This lamination does not retract under further heating or solvent action and is stable to general weathering conditions.

In the proximity reaction, a second chemical compound may be formed by condensation which is then removed from the film. For example, if hydrogen and alkoxide groups are reacting, a free alcohol is produced which evaporates from the surface in the form of vapor 29.

In the above described polarizing composition, alternative materials may be employed to achieve similar structures, and also certain variations and properties, which yet fall within the scope of the present invention.

*Example 1*

A polarizing composition is prepared from the following solutions: AA, BB, CC and DD.

ORGANIC POLYMER NO. AA

|  | Parts by wt. |
|---|---|
| High molecular weight polyvinyl alcohol | 200 |
| n-Propanol | 200 |
| Water-distilled | 600 |

Powdered polyvinyl alcohol is first mixed into a paste with the alcohol and n-propanol, and then the distilled water is added with stirring. The composition then is heated with continued stirring to about 70° for several hours until solution is complete. The solution is then filtered through a ceramic filter to produce a clear solution.

INORGANIC POLYMER NO. BB

|  | Parts by wt. |
|---|---|
| $H_2O$ plus 1%–39% HCl | 150 |
| Tetraethylorthosilicate | 850 |

The mixture of the tetraethylorthosilicate in a stoichiometric concentration of dilute acid is reacted completely by subjecting the components to violent agitation so that sufficient miscibility is achieved to start the reaction—whereafter it proceeds to completion. The agitation is continued for about 5 minutes until a clear solution is formed. During and after the agitation stage the solution rises in temperature to about 60° C. This temperature is maintained for a period of about one hour by placing the material in an air oven at this temperature. The solution is then allowed to cool to room temperature and stored for about one week at about 10–15° C. during which time it thickens and gels due to the continuation of polymerization. A solution so prepared is more stable and gels less quickly than solutions containing a lower concentration of polysilicate. For the purpose of this process this solution can be used up to 4 or 5 days if stored at such low temperatures. So prepared the hydrolyzed tetraethylorthosilicate comprises two or more monomeric molecules joined together by the elimination of the ethyl alcohol. The silicon atoms are joined by oxygen bridges and surrounded by reactive ethyloxide groups, into a linear polymeric inorganic chain known as a siloxane. By this technique a concentration of almost 25% polysilicate in a solution of ethyl alcohol only is provided. Compositions prepared from this solution have a high solids content which permit the production of comparatively thick films.

DICHROIC MATERIAL NO. CC.

|  | Parts by wt. |
|---|---|
| Iodine | 200 |
| Ethanol | 800 |

To prepare this solution, the iodine is added to the alcohol, the composition is heated to 70° C., and the mixture is thereafter agitated until all the iodine is dissolved. After cooling the solution is filtered through a fritted glass filter.

TEMPORARY PLASTICIZER AND CROSS-LINKING AGENT NO. DD

|  | Parts by wt. |
|---|---|
| Glycerine | 85 |
| Boric acid | 15 |

The boric acid is highly soluble in the glycerine and is only stirred and filtered through a ceramic filter.

Solutions Nos. AA and BB then are mixed together and thereafter solution No. DD is added and stirring continued until a uniform solution is obtained. Thereafter solution No. CC is added and stirring continued until the solution is uniform and flows readily.

POLARIZING COMPOSITION NO. EE

| Solution No. | Percent Solids | Total Solution, Percent Solids | Solution Total |
|---|---|---|---|
| AA | 20 | 35 | 175 |
| BB | 24.6 | 50 | 200 |
| DD | 100 | 7 | 7 |
| CC | 20 | 8 | 40 |
|  |  |  | 425 |

Percent solids in total solution equals 23.5%.

Upon extending polarizing composition No. EE in the manner of the process steps described in detail above, a stable oriented, non-retractable light polarizing film of high durability and solvent and temperature resistance is produced.

*Example 2*

A crystallizing composition is prepared as in Example 1, by mixing solution Nos. AA and BB and then adding solution No. DD. Upon extending this composition, a permanently oriented birefringent film having the desirable physical characteristics of the light polarizing film is obtained.

*Example 3*

A polarizing composition is prepared by mixing solution Nos. AA and BB and thereafter adding solution No. CC. Upon extending this composition upon a casting surface in the manner described, a stable, oriented, non-retractable light polarizing film is produced.

*Example 4*

When equivalent quantities of polyvinyl alcohol-acetate copolymer, polyvinyl butyral, polyvinyl alcohol-pyrrolidine copolymer and polyvinyl alcohol-acrylonitrile copolymer are substituted for polyvinyl alcohol in Examples 1–3, stable, oriented birefringent and light polarizing films are produced.

*Example 5*

Using equivalent quantities of polytitanates, polystannates, polygermanates, polyvanadates, polyzirconates and polyphosphates in place of polysiloxane in Examples 1–4, there are provided stable, oriented, non-retractable polymeric, birefringent and light polarizing films which are temperature and solvent stable.

*Example 6*

When the concentration of solution AA is varied between 30 and 60 parts by weight of the total composition, solution BB between 70 and 30 parts by weight, solution CC between 0–25 parts by weight, and DD between 0–2 parts by weight in the above Examples 1–5, there are obtained the same advantageous films as before.

Having thus fully described the invention what is claimed as new and desired to be secured by Letters Patent of the United States is:

1. A stable, oriented, non-retractable polymeric film formed by casting and stretch-orienting a crystallizing composition comprising at least 30 and not more than 60 parts by weight of film-forming, stretchable, elongated linear organic polyvinyl polymer and not more than 70 and at least 30 parts by weight of a polysiloxane having an inorganic skeletal structure and side groups reactive with said linear organic polymer on stretch orientation thereof, and unreactive prior to stretch-orientation.

2. A film according to claim 1 wherein said polyvinyl polymer is selected from the group consisting of polyvinyl alcohol, polyvinyl alcohol-acetate copolymer, polyvinyl butyral, polyvinyl alcohol-pyrrolidine copolymer and polyvinyl alcohol-acrylonitrile copolymer.

3. A film according to claim 1 wherein said polyvinyl polymer is polyvinyl alcohol.

4. A stable, oriented, non-retractable, light-polarizing polymeric film formed by casting and stretch-orienting a crystallizing composition comprising at least 30 and not more than 60 parts by weight of a film-forming, stretchable, elongated linear organic polyvinyl polymer, not more than 70 and at least 30 parts by weight of a polysiloxane having an inorganic skeletal structure and side groups reactive with said linear organic polymer, on stretch-orientation thereof, and unreactive therewith prior to stretch-orientation, and at least 5 and not more than 25 parts by weight of dichroic material intercrystallized therewith.

5. A light-polarizing film according to claim 4 wherein said polyvinyl polymer is selected from the group consisting of polyvinyl alcohol, polyvinyl alcohol-acetate copolymer, polyvinyl butyral, polyvinyl alcohol-pyrrolidine copolymer and polyvinyl alcohol-acrylonitrile copolymer.

6. A light-polarizing film according to claim 4 wherein said polyvinyl polymer is polyvinyl alcohol.

7. A light-polarizing film according to claim 4, wherein said dichroic material is iodine.

References Cited by the Examiner

UNITED STATES PATENTS

| | | | |
|---|---|---|---|
| 2,432,113 | 12/1947 | Marks et al. | 88—65 X |
| 2,445,555 | 7/1948 | Binda | 88—65 |
| 2,453,186 | 11/1948 | Binda | 264—2 |
| 2,487,063 | 11/1949 | Marks | 88—65 |
| 2,572,315 | 10/1951 | Campbell | 88—65 |
| 2,945,003 | 7/1960 | Olson et al. | 260—827 X |
| 2,965,593 | 12/1960 | Dietz | 260—827 X |
| 2,981,980 | 5/1961 | Brown et al. | 264—2 |
| 3,051,054 | 8/1962 | Crandon | 88—65 |
| 3,075,941 | 1/1963 | Wynstra et al. | 260—827 X |

DAVID H. RUBIN, *Primary Examiner.*

ALEXANDER H. BRODMERKEL, *Examiner.*

J. R. DUNCAN, *Assistant Examiner.*